(12) United States Patent
Horio

(10) Patent No.: US 6,615,817 B2
(45) Date of Patent: Sep. 9, 2003

(54) RECYCLING SYSTEM OF WIRE SAW ABRASIVE GRAIN SLURRY AND CENTRIFUGAL SEPARATORS THEREFOR

(76) Inventor: Motoichi Horio, Sunmansion Chigusakoen F302, 2-3-4 Wakamizu, Chigusa-ku, Nagoya-shi, Aichi (JP)

( * ) Notice: Subject to any disclaimer, the term of this patent is extended or adjusted under 35 U.S.C. 154(b) by 0 days.

(21) Appl. No.: 09/818,536

(22) Filed: Mar. 28, 2001

(65) Prior Publication Data

US 2001/0039946 A1 Nov. 15, 2001

(30) Foreign Application Priority Data

Mar. 31, 2000 (JP) .......................................... 2000-98464
Oct. 18, 2000 (JP) ........................................ 2000-318142

(51) Int. Cl.⁷ ................................................ B28D 1/06
(52) U.S. Cl. ................................ 125/16.01; 125/16.02; 451/60; 451/87; 451/88; 494/53; 494/54; 210/199.1; 210/195.3; 210/166
(58) Field of Search ........................... 125/16.01, 16.02; 451/60, 87, 88; 494/53, 54; 210/195.1, 195.3, 166

(56) References Cited

U.S. PATENT DOCUMENTS 4,217,207 A * 8/1980 Liller ........................... 209/13
5,799,643 A 9/1998 Miyata et al.
6,322,710 B1 * 11/2001 Katsumata et al. ......... 210/740

FOREIGN PATENT DOCUMENTS

| JP | 9-168971 | 6/1997 |
| JP | 9-193144 | 7/1997 |
| JP | 11-33913 | 2/1999 |
| JP | 11-172237 | 6/1999 |

* cited by examiner

Primary Examiner—Joseph J. Hail, III
Assistant Examiner—Shantese McDonald
(74) Attorney, Agent, or Firm—Armstrong, Westerman & Hattori, LLP

(57) ABSTRACT

A constitution comprises separated processing of an abrasive grain waste liquid into recycled abrasive grain and a fine abrasive grain mixed liquid in a first centrifugal separator, adding a fresh cutting liquid to the fine abrasive grain mixed liquid to direct the resulting liquid to a second centrifugal separator to subject the same to separated processing in the second centrifugal separator, into waste abrasive grain and a recovered cutting liquid directing the recovered cutting liquid through a recovered cutting liquid tank to a recovered abrasive grain tank, adding fresh abrasive grain and a cutting liquid for dilution to the recovered cutting liquid in the recovered cutting liquid tank and to the recycled abrasive grain to create a recycled abrasive grain mixed cutting liquid, and feeding the recycled abrasive grain mixed cutting liquid to an abrasive grain supply tank. Accordingly, an abrasive grain waste liquid is subjected to separated processing and fresh abrasive grain and a cutting liquid are added thereto to enable making effective use of them as recycled abrasive grain and a recovered cutting liquid. Also, it is possible to attain effective separation in the second centrifugal separator or to reduce wear of and damage on a blade edge of a screw of the second centrifugal separator.

2 Claims, 4 Drawing Sheets

RECYCLING SYSTEM OF WIRE SAW ABRASIVE GRAIN SLURRY AND CENTRIFUGAL SEPARATORS THEREFOR

BACKGROUND OF THE INVENTION

The invention relates to a recycling system of wire saw abrasive grain slurry and centrifugal separators therefore.

Conventionally, a wire saw sakes use of an abrasive grain slurry, in which abrasive grain as a cutting material and a cutting liquid are mixed with each other. Recently, the abrasive grain and the cutting liquid, which have been used, are recovered, separated and recycled for effective use (reduction in cutting cost) of resources or environmental conservation. Documents (1) and (2) intended for recycling of a wire saw abrasive grain slurry are explained below.

The document (1) describes a method and an apparatus for recycling of wire saw abrasive grain slurry, disclosed in Japanese Patent Laid-Open No. 172237/1999.

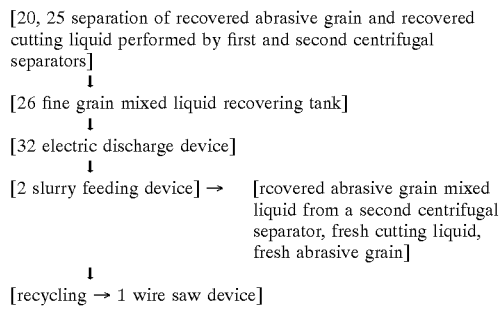

The document (2) describes a wire saw abrasive grain circulating apparatus, disclosed in Japanese Patent Laid-Open No. 33913/1999, and contents thereof are explained schematically.

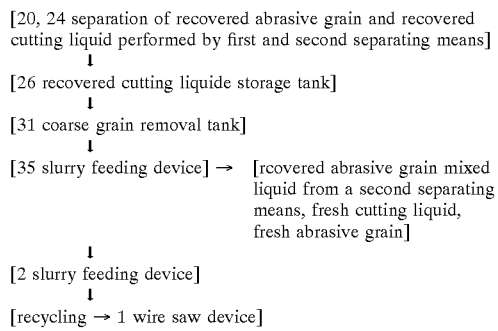

The constitution described in the above documents (1) and (2) is problematic in that the fine grain mixed liquid from the first separating means is directly supplied to the second separating means. That is, there are involved problems that separation and recovery of abrasive grain and a cutting liquid are not effected smoothly due to viscosity of the fine grain mixed liquid leading to incapability of efficient separation in the second separating means, and load is liable to apply on a screw of the second separating means and abrasion and damage are liable to generate on the screw, and that amounts of feed of abrasive grain and the cutting liquid cannot be minutely adjusted.

Also, the documents (1) and (2) are problematic in that a specific constitution is not employed for a blade edge of and rotational control of the screw of the separating means. That is, problems are conceivable in association with abrasion, damage or the like on the blade edge or disposition of load.

Further, the documents (1) and (2) are problematic in that a teed rate of an abrasive grain waste liquid, a feed rate of a fine grain mixed liquid, a feed rate of a fresh cutting liquid and feed rates of fresh abrasive grain and a cutting liquid for dilution are not subjected to computer control with the use of not. That is, there are involved problems in incapability of precise adjustment of the respective feed rates, need of or and the like.

SUMMARY OF THE INVENTION

Embodiments of the invention will be described below.

An abrasive grain waste liquid used is directed to an undiluted solution tank from a wire saw. The abrasive grain waste liquid in the undiluted solution tank is directed to a first centrifugal separator by way of a first pipe to be separated therein into recycled abrasive grain and a fine abrasive grain mixed liquid for processing. An amount (feed rate) of the abrasive grain waste liquid directed to the first centrifugal separator is input into a hose computer (referred below to as a computer) by way of a net. The input amount of the abrasive grain waste liquid is subjected to arithmetic processing in the computer and settlement in terms of money. In addition, the first centrifugal separator is intended for reduction in wear of a blade edge of a screw by the provision of a cemented carbide chip on the blade edge of the screw, or for achievement of sure feed and serviceability in sure and smooth separated processing. Also, when load is applied on the screw, a servomotor provided with a control unit (feedback, controller, sensor or the like) is used to control the rotating speed of the screw, thus preventing failure of the first centrifugal separator and the screw. If wear and/or failure are caused on the screw of the first centrifugal separator, this is input into the computer with the use of a net as desired. The degree of wear is examined compared with a set dimension, and so the computer performs arithmetic processing of efficiency, endurance time and so on to provide judgment of best and efficient states or the like. This judgment control leads to settlement in terms of Money to be concluded in transaction. Also, repairing of the first centrifugal separator, replacement of parts therefor and the like are subjected to arithmetic processing in the computer to lead to settlement in terms of money to be concluded in transaction.

The recycled abrasive grain separated and processed is directed to a recovered abrasive grain tank through a second pipe. Also, the fine abrasive grain mixed liquid is directed to a separated liquid tank through a third pipe. The separated liquid tank reduces an amount of the recycled abrasive grain being fed to the recovered abrasive grain tank, thereby decreasing mixing, described later, of chips into the recovered abrasive grain tank for ensuring quality of a recovered abrasive grain mixed liquid.

A fine abrasive grain mixed liquid in the separated liquid tank is directed to a second centrifugal separator by means of a fourth pipe, in the course of which a fresh cutting liquid is supplied to the fine abrasive grain mixed liquid by way of a fifth pipe to dilute the same. The purpose of such dilution is to dilute viscosity of the fine abrasive grain mixed liquid to ensure an amount of the fine abrasive grain mixed liquid fed to the second centrifugal separator and to achieve efficient separation into recycled abrasive grain and a recovered cutting liquid in the second centrifugal separator. Also, load on a screw of the second centrifugal separator is reduced and abrasion, damage and the like on the screw are avoided. Further, the purpose of such dilution is to replenish an amount of the recycled abrasive grain fed to the recovered abrasive grain tank. An amount of the fine abrasive grain mixed liquid (feed rate of a fresh abrasive grain mixed liquid) and an amount of a fresh cutting liquid (feed rate of a fresh cutting liquid) are input into the computer by way of the net. Amounts of the fine abrasive grain mixed liquid and the fresh cutting liquid are subjected to arithmetic processing in the computer to lead to settlement in terms of money to be concluded in transaction.

The fine abrasive grain mixed liquid thus diluted is subjected to separated processing into waste abrasive grain and a recovered cutting liquid in the second centrifugal separator, and the recovered cutting liquid is directed to a recovered cutting liquid tank through a seventh pipe.

The recovered cutting liquid tank in the recovered cutting liquid tank is directed to a recovered abrasive grain tank by way of an eighth pipe to be mixed with the recycled abrasive grain in the recovered abrasive grain tank, and fresh abrasive grain for dilution and a cutting liquid, respectively, are added by way of ninth and tenth pipes to create a recycled abrasive grain mixed cutting liquid (recycled abrasive grain cutting liquid). Amounts of a fresh abrasive grain and a fresh cutting liquid (feed rates of a fresh abrasive grain and a fresh cutting liquid) are input into the computer by way of the net. The amounts of the fresh abrasive grain and the fresh cutting liquid are subjected to arithmetic processing in the computer for quality control. Alternatively, the amounts of the fresh abrasive grain and the fresh cutting liquid are subjected to arithmetic processing in the computer to lead to settlement in terms of money to be concluded in transaction.

The recycled abrasive grain mixed cutting liquid is supplied to an abrasive grain supply tank by way of an eleventh pipe, and is supplied to the wire saw by way of a twelfth pipe from the abrasive grain supply tank. Also, an amount of a recycled abrasive grain mixed cutting liquid together with a set amount of a recycled abrasive grain mixed cutting liquid is subjected to arithmetic processing in the computer for quality control. Alternatively, the amount of the recycled abrasive grain mixed cutting liquid is subjected to arithmetic processing in the computer to lead to settlement in terms of money to be concluded in transaction.

DESCRIPTION OF THE PREFERRED EMBODIMENTS

Figure 1:
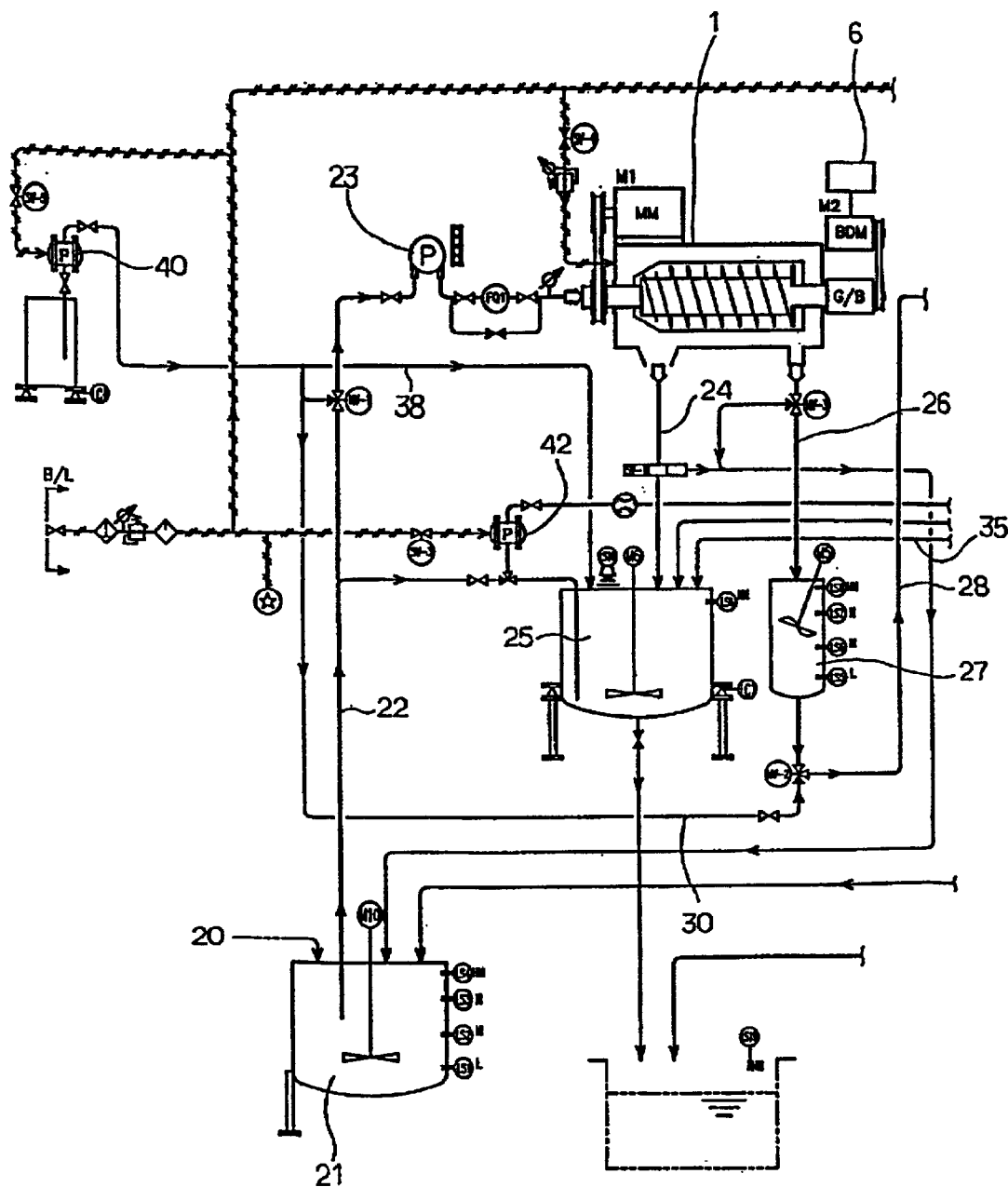
FIG. 1 is a flowchart showing a preprocessing in the invention.

First and second centrifugal separators 1, 10 used in a recycling system of wire saw abrasive grain slurry, according to the invention are of the same construction in principle, and so an explanation will be mainly given to the first centrifugal separator 1. The centrifugal separator 1 comprises a casing 2 provided with a solid matter discharge port 2a and a separated liquid discharge port 2b, a bamboo-shaped screw 3 provided in an inner cylinder 200 of the casing 2, a cemented carbide chip 4 provided on a blade edge 3a of the screw 3, a servomotor 5 for driving of the screw 3, a control unit 6 for controlling the servomotor 5, and a supply pipe 7 for abrasive grain waste liquid or fine abrasive grain mixed liquid present on the screw 3. An opening 7a of the supply pipe 7 is communicated to an opening 8 provided on the screw 3 and in a gap between it and a body 300 of the screw 3. Also, the supply pipe 7 is driven by a motor 9. In addition, the second centrifugal separator 10 corresponds to the first centrifugal separator 1.

Subsequently, an explanation will be given to the entire system in terms of constitution and function.

An abrasive grain waste liquid having been used is directed to an undiluted solution tank 21 through a pipe (not shown) from a wire saw 20. The first pipe 22 and a pump 23 cause the abrasive grain waste liquid in the undiluted solution tank 21 to be directed to the first centrifugal separator 1 to be separated into recycled abrasive grain and a fine abrasive grain mixed liquid for processing. The recycled abrasive grain is directed to a recovered abrasive grain tank 25 through a second pipe 24 from a solid matter discharge port 2a. Also, the fine abrasive grain mixed liquid is directed to a separated liquid tank 27 through a third pipe 26 from a separated liquid discharge port 2b. An amount of the abrasive grain waste liquid is input into a computer 101 via communication lines such as a net 100 or the like. In addition, a degree of abrasion of the cemented carbide chip 4 provided on the blade edge 3a of the screw 3 is input into the computer 101 via communication lines such as the net 100 or the like.

The fine abrasive grain mixed liquid in the separated liquid tank 27 is directed to the second centrifugal separator 10 by means of a fourth pipe 28 and a pump 29, in the course of which a fresh cutting liquid is supplied to the fine abrasive grain mixed liquid by way of a fifth pipe 30 to dilute the same. The purpose of such dilution is to dilute viscosity of the fine abrasive grain mixed liquid to achieve efficient separation into recycled abrasive grain and a recovered cutting liquid in the second centrifugal separator 10. Also, load on the screw 3 of the second centrifugal separator 10 is reduced and abrasion, damage and the like on the screw 3 are avoided. Amounts of the fresh cutting liquid and/or the fine abrasive grain mixed liquid are input into the computer 101 via communication lines such as the net 100 or the like.

The fine abrasive grain mixed liquid thus diluted is separated into waste abrasive grain and a recovered cutting liquid in the second centrifugal separator 10 for processing, the waste abrasive grain being directed to a waste liquid abrasive grain tank 32 through a sixth pipe 31 from the solid matter discharge port 2b. Also, the recovered cutting liquid is directed to a recovered cutting liquid tank 34 through a seventh pipe 33 from the solid matter discharge port 2b. An amount of the fine abrasive grain mixed liquid is input into the computer 101 via communication lines such as the net 100 or the like.

The recovered cutting liquid in the recovered cutting liquid tank 34 is directed to the recovered abrasive grain tank 25 by way of an eighth pipe 35 and a pump 36 to be mixed with recycled abrasive grain in the recovered abrasive grain tank 25, and fresh abrasive grain and a cutting liquid, respectively, for dilution are added by way of ninth and tenth pipes 37, 38 and pumps 39, 30 to create a recycled abrasive grain mixed cutting liquid (recycled abrasive grain cutting liquid). Amounts of the fresh cutting liquid and/or the fine abrasive grain mixed liquid and/or the recycled abrasive grain mixed cutting liquid are input into the computer 101 via communication lines such as the net 100 or the like.

The recycled abrasive grain mixed cutting liquid is supplied to an abrasive grain supply tank 43 by way of an eleventh pipe 41 and a pump 42, and is supplied to the wire saw 20 by way of a twelfth pipe 44 and a pump 45 from the abrasive grain supply tank 43. An amount of recycled abrasive grain mixed cutting liquid is input into the computer 101 via communication lines such as the net 100 or the like.

In addition, the respective tanks are provided with agitating vanes, liquid level sensors or the like at need. The respective pipes are provided with flow meters, bypass pipes, valves of various functions or the like at need.

The invention according to claim 1 comprises separated processing of an abrasive grain waste liquid into recycled abrasive grain and a fine abrasive grain mixed liquid in a first centrifugal separator, adding a fresh cutting liquid to the fine abrasive grain mixed liquid to direct the resulting liquid to a second centrifugal separator to subject the same to separated processing in the second centrifugal separator, into waste abrasive grain and a recovered cutting liquid, directing the recovered cutting liquid to a recovered cutting liquid tank and directing the recovered cutting liquid in the recovered cutting liquid tank to the recovered abrasive grain tank, adding fresh abrasive grain and a cutting liquid for dilution to the recovered cutting liquid in the recovered cutting liquid tank and to the recycled abrasive grain to create a recycled abrasive grain mixed cutting liquid, and feeding the recycled abrasive grain mixed cutting liquid to an abrasive grain supply tank. Accordingly, an abrasive grain waste liquid is subjected to separated processing and fresh abrasive grain and a cutting liquid are added thereto to enable making effective use of them as recycled abrasive grain and a recovered cutting liquid. Also, it is possible to attain effective separation in the second centrifugal separator or to reduce wear of and damage on a blade edge of a screw of the second centrifugal separator.

A centrifugal separator employed in a wire saw abrasive grain slurry recycling system, according to the invention of claim 2 comprises a casing provided with a solid matter discharge port and a separated liquid discharge port, a screw provided in the casing, a cutting liquid supply pipe provided in the screw, a supply port provided in the screw to be communicated to the cutting liquid supply pipe, a cemented carbide chip provided on an entire blade edge of the screw, a servomotor for controlling the rotating speed of the screw when load is applied on the screw, and a control unit for controlling the servomotor. Accordingly, it is possible to reduce load on the first and second centrifugal separators and to reduce wear of and damage on blade edges of screws.

A wire saw abrasive grain slurry recycling system for computer control, according to the invention of claim 3, including first and second centrifugal separators for separated processing of an abrasive grain waste liquid into recycled abrasive grain and a fine abrasive grain mixed liquid, a recovered abrasive grain tank supplied with recycled abrasive grain and fresh abrasive grain or a fresh cutting liquid, an abrasive grain supply tank, a separated liquid tank, and a recovered cutting liquid tank, comprises inputting amounts of the abrasive grain waste liquid, the fine abrasive grain mixed liquid, the fresh abrasive grain and the fresh cutting liquid into a computer with the use of a net, performing arithmetic processing of input values individually with respect to an amount of the abrasive grain taste liquid or a set amount of the fine abrasive grain mixed liquid, and an amount of the fresh abrasive grain or a set amount of the fresh cutting liquid, performing computer control as to whether numerical values by the arithmetic processing are within allowable ranges, confirming a state of the control on the net, and controlling an amount of the abrasive grain waste liquid or an amount of the fine abrasive grain mixed liquid, and an amount of the fresh abrasive grain or an amount of the fresh cutting liquid to endure quality of recycled abrasive grain slurry. Accordingly, it is possible to surely and easily attain supply control of an amount of the abrasive grain waste liquid or an amount of the fine abrasive grain mixed liquid, and an amount of the fresh abrasive grain or an amount of the fresh cutting liquid by the use of the net. Also, it is possible to attain reduction in amount of use of expensive abrasive grain slurry, effective use of resources and prevention of environmental disruption due to a abrasive grain waste liquid left as it is.

Figure 2:
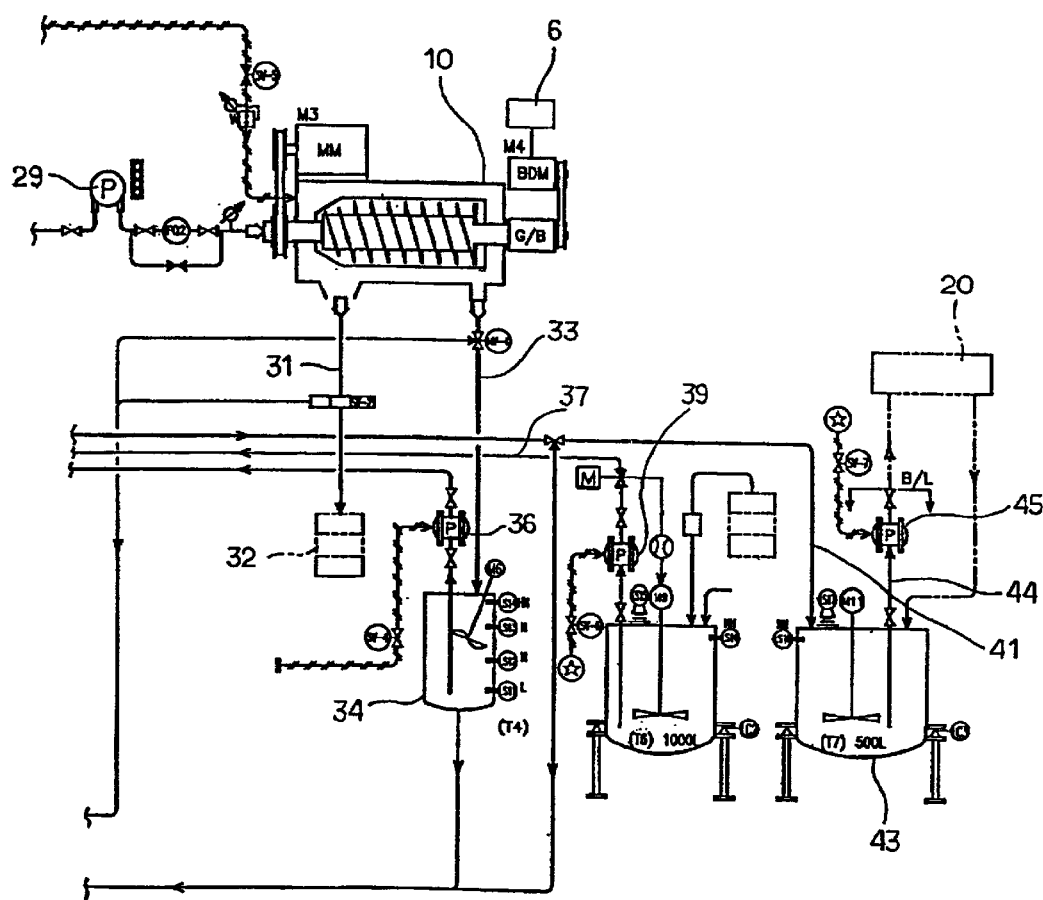
FIG. 2 is a flowchart showing an afterprocessing in the invention.
Figure 3:
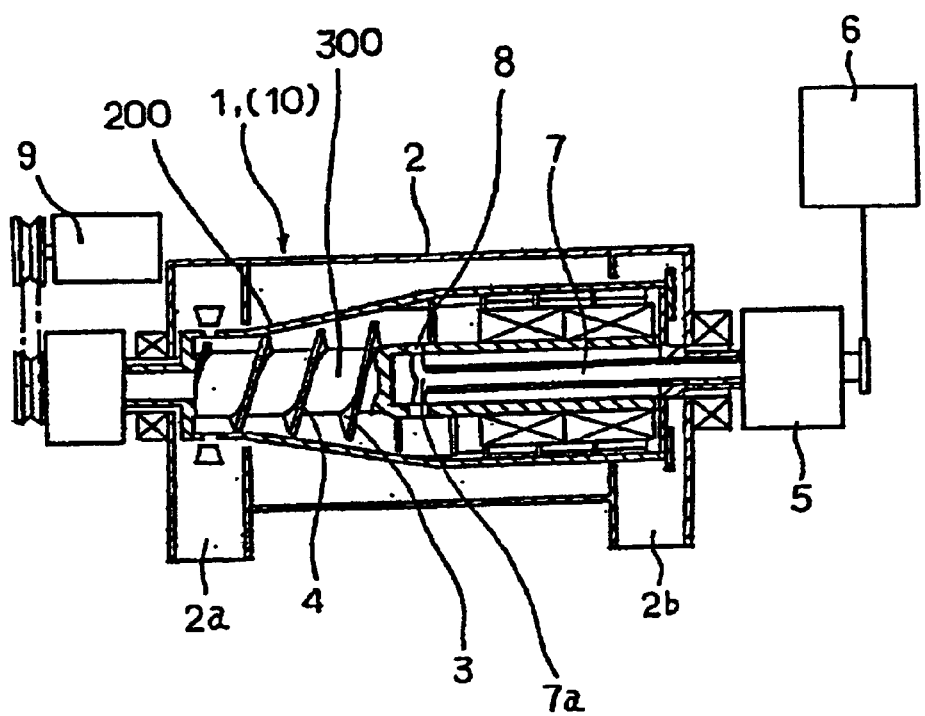
FIG. 3 is an enlarged, schematic view showing first and second centrifugal separators.
Figure 4:
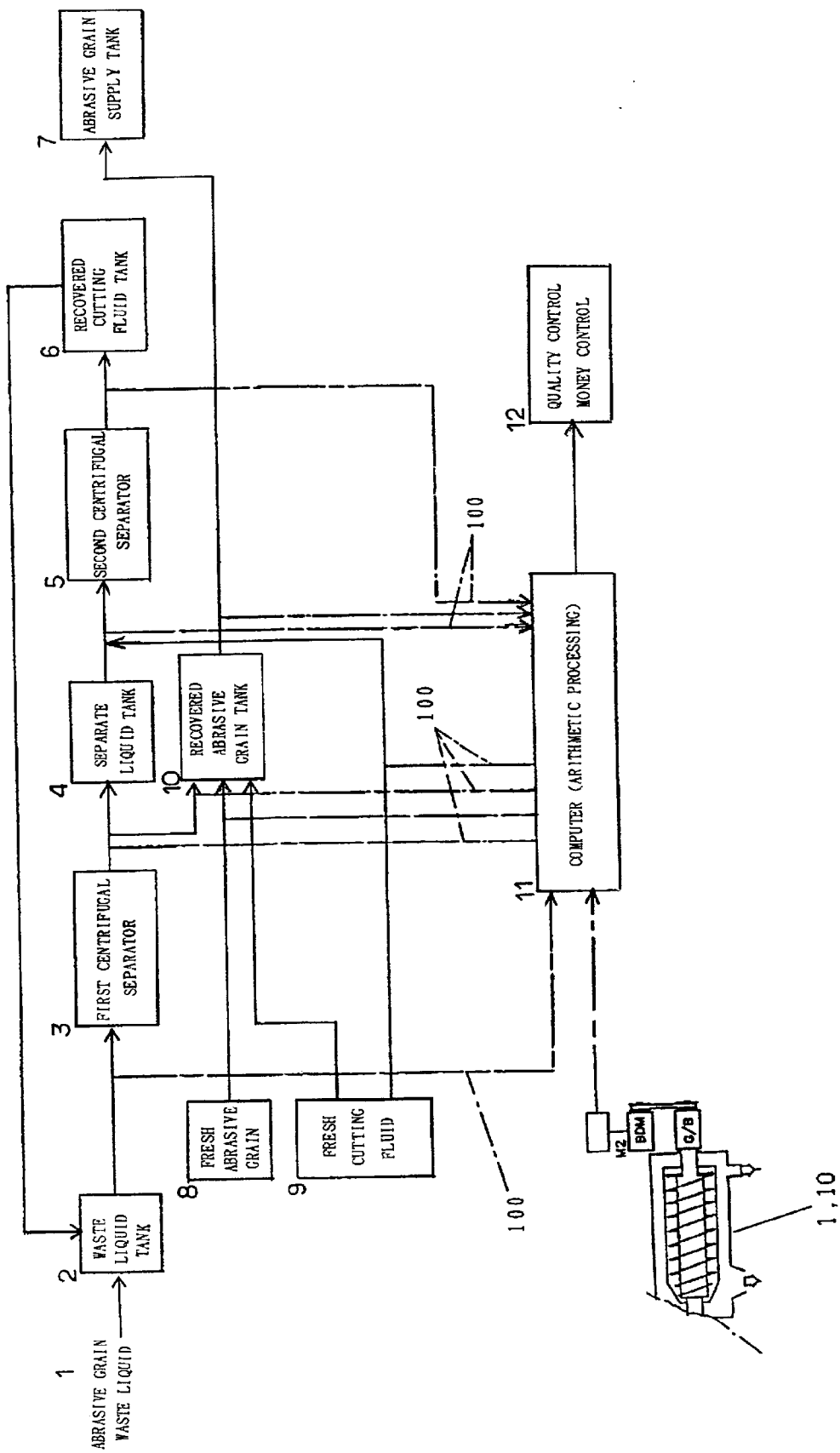
FIG. 4 is a flowchart illustrating an outline of a managing system according to the invention.

FIG. 1
1: FIRST CENTRIFUGAL SEPARATOR
6: CONTROL UNIT
20: WIRE SAW 20
21: UNDILUTED SOLUTION TANK
22: FIRST PIPE 22
23: PUMP
24: SECOND PIPE
25: RECOVERED ABRASIVE GRAIN TANK
26: THIRD PIPE
27: SEPARATED LIQUID TANK
28: FOURTH PIPE
30: FIFTH PIPE
35: EIGHTH PIPE 35
38: TENTH PIPE
40: PUMP
FIG. 2
10: SECOND CENTRIFUGAL SEPARATOR
29: PUMP
31: SIXTH PIPE
32: WASTE LIQUID ABRASIVE GRAIN TANK
33: SEVENTH PIPE 33
34: RECOVERED CUTTING FLUID TANK
36: PUMP
37: NINTH PIPE
39: PUMP
41: ELEVENTH TANK 41
43: ABRASIVE GRAIN SUPPLY TANK 43
44: TWELFTH PIPE 44
45: PUMP
FIG. 3
2A: SOLID MATTER DISCHARGE PORT
2B: SEPARATED LIQUID DISCHARGE PORT
3: SCREW
4: CEMENTED CARBIDE CHIP
5: SERVOMOTOR
7: SUPPLY PIPE
7A: OPENING
8: OPENING
9: MOTOR
200: INNER CYLINDER
300: BODY
FIG. 4
1: ABRASIVE GRAIN WASTE LIQUID
2: WASTE LIQUID TANK
3: FIRST CENTRIFUGAL SEPARATOR
4: SEPARATE LIQUID TANK
5: SECOND CENTRIFUGAL SEPARATOR
6: RECOVERED CUTTING FLUID TANK
7: ABRASIVE GRAIN SUPPLY TANK

8: FRESH ABRASIVE GRAIN
9: FRESH CUTTING FLUID
10: RECOVERED ABRASIVE GRAIN TANK
11: COMPUTER (ARITHMETIC PROCESSING)
12: QUALITY CONTROL MONEY CONTROL

What is claimed is:

1. A system of recycling a wire saw abrasive grain slurry, the system comprising the steps of:

directing an abrasive grain waste liquid to a first centrifugal separator by way of a pipe for separated processing into recycled abrasive grain and a fine abrasive grain mixed liquid in the first centrifugal separator, directing the recycled abrasive grain to a recovered abrasive grain tank by way of a pipe, directing the fine abrasive grain mixed liquid to a separated liquid tank by way of a pipe, adding fresh cutting liquid to the fine abrasive grain mixed liquid in the separated liquid tank to direct the resulting liquid to a second centrifugal separator by way of a pipe to separate the resulting liquid in the second centrifugal separator into waste abrasive grain and a recovered cutting liquid, directing the recovered cutting liquid to a recovered cutting liquid tank by way of a pipe and then directing the recovered cutting liquid in the recovered cutting liquid tank to the recovered abrasive grain tank by way of a pipe, adding fresh abrasive grain and adding cutting liquid for dilution to the recovered cutting liquid and to the recycled abrasive grain by way of respective pipes to create a recycled abrasive grain mixed cutting liquid, and feeding the recycled abrasive grain mixed cutting liquid to an abrasive grain supply tank by way of a pipe.

2. A wire saw abrasive grain slurry recycling system for computer control of the steps of:

directing a feed rate valve of an abrasive grain waste liquid to a first centrifugal separator by way of a pipe for separated processing in the first centrifugal separator into recycled abrasive grain and a fine abrasive grain mixed liquid, said first centrifugal separator being under computer control through the use of a net, directing the recycled abrasive grain to a recovered abrasive grain tank by way of a pipe, directing the fine abrasive grain mixed liquid to a separated liquid tank by way of a pipe under computer control with the use of the net, adding a feed rate valve of a fresh cutting liquid to the fine abrasive grain mixed liquid in the separated liquid tank under computer control with the use of the net to direct the resulting liquid to a second centrifugal separator by way of a pipe to separate the resulting liquid in the second centrifugal separator into waste abrasive grain and a recovered cutting liquid, directing the recovered cutting liquid to a recovered cutting liquid tank by way of a pipe and then directing the recovered cutting liquid in the recovered cutting liquid tank to the recovered abrasive grain tank by way of a pipe, adding a feed rate value of fresh abrasive grain and adding a feed rate value of a cutting liquid for dilution to the recovered cutting liquid and to the recycled abrasive grain by way of respective pipes under computer control with the use of the net to create a recycled abrasive grain mixed cutting liquid, and feeding the recycled abrasive grain mixed cutting liquid to an abrasive grain supply tank.

\* \* \* \* \*